Oct. 30, 1928.

F. KERTÉSZ 1,689,783

BEARING ESPECIALLY FOR RAILWAY VEHICLES

Filed Oct. 1, 1925

Patented Oct. 30, 1928.

1,689,783

UNITED STATES PATENT OFFICE.

FERENC KERTÉSZ, OF BUDAPEST, HUNGARY.

BEARING ESPECIALLY FOR RAILWAY VEHICLES.

Application filed October 1, 1925, Serial No. 59,854, and in Germany October 4, 1924.

The subject of the invention is a journal box, made of plate by pressing and bending, especially for railway-vehicles. Heretofore such journal boxes were made in different ways, all of them however, very expensive. These journal boxes had all sorts of joints, very difficult to finish, for preventing the oozing out of lubricating oil.

I obtain a good tightness of the journal box by a simple and cheap manufacturing method, the upper part of the journal box being made of a simple buckler formed plate, whereas the lower part, which consists of a separate piece is pressed into a cup form. These pieces fit each other like the bottom and upper part of a box, the edges of which overlap each other. In this way tightness of the bearing is absolutely guaranteed.

In the enclosed drawings are shown the parts of the journal box.

Figure 3:
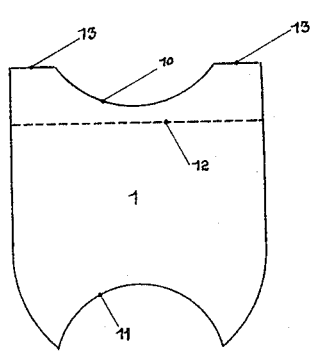
Figures 3-6 show the manner of manufacturing the journal box.

The plate pressed box consists of the upper part —1— and of the lower part —1ª—, which are united in a suitable manner. The upper part —1—, already described is made of a buckler formed plate (Fig. 3) being pressed on top to a half-cylinder form. The lower part —1ª— is also pressed from plate to a cup form and its upper edges overlap the lower edges of the upper part of the journal box, or vice versa. With this simple manufacturing manner a tight fit of the bearing is guaranteed, so as to prevent the oozing out of the oil.

On top of the box consisting of part —1— and —1ª—, there is fitted a forged spring-collar against which rests the spring of the car and on which hole —8— is bored for the pivot in the spring.

Reference numeral —3— indicates the journal and —4— the bearing, which is half cylinder formed and made either by pressing a plate or casting. The bearing in the box is secured against any sort of movement. This is for example so shown in the drawing. Stirrups 5 are fastened on the inner wall of the box, which should be in connection with the fitted play-limiters 7 and 8ª.

Figure 2:
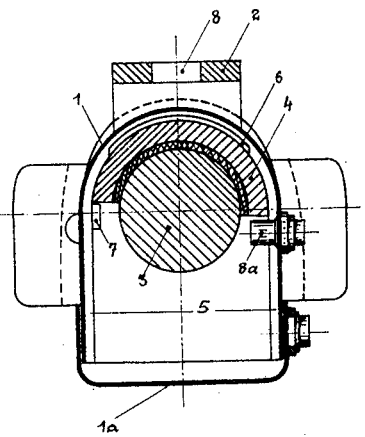

The stirrups —5— are above entirely joined to the boxes and to the bearings, so they are exactly half-cylinder formed, their straight parts are parallel and lie along both sides of the box (Fig. 2).

By so shaping the stirrups they are simultaneously able to conduct the bearing and secure it against any axial displacement. Furthermore the vibration of the car's axle is taken up through the stirrups and so it serves also to stiffen the thin plate forming the wall of the box.

The play-limiters 7 and 8ª, which are on both inner sides of the box, prevent the bearing from dropping. The play limiters are firmly fastened either on the inner wall of the box —1—, or on the inner side of the stirrups 5. The play limiters are removable and may be made in the form of screws. The play limiters 7 and 8ª secure the bearing in a simple manner against any kind of movement while the car is traveling.

If I want to remove the bearing for the purpose of renewal or changing, it is not necessary to dismount the whole journal box, it is necessary only to lift the box about $\tfrac{1}{16}$ inch, so that the bearing will be loosened up. Now, when I remove the play limiting screw, the bearing —4— may be turned down around the upper half-cylinder formed vault of the box into the lower part of the journal box and may be pulled out of the front opening of the journal box. In the same manner a new bearing may be inserted. Dust-disk 9 made from wood or from some different material serves to make the rear opening of the journal tight and is placed between the rear wall of the box and the rear end of the bearing. On the dust-disk may be fastened flat-springs which press the rear end of the bearing and hence press the dust-disk against the rear wall of the journal. By this simple construction no opening is needed in the upper part of the journal for placing in the dust-disk as it may be placed in the front opening of the journal box.

Figure 1:
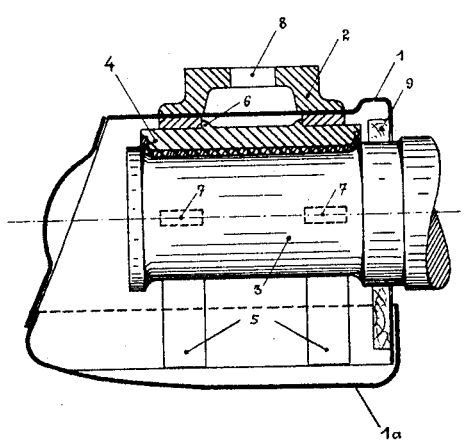
Figures 1 and 2 show the journal box in side and end cross section.

When it is necessary to provide a small place in the box for a vertical movement of the dust-disk, in a suitable manner the box may be bent out above the dust-disk. (Fig. 1 right side.)

Figure 4:
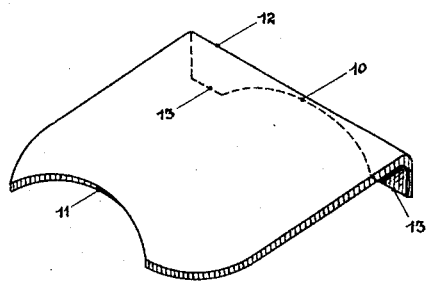
Figure 5:
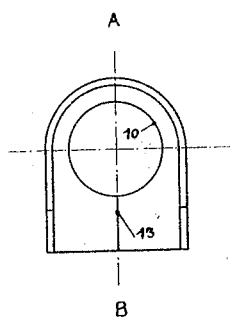
Figure 6:
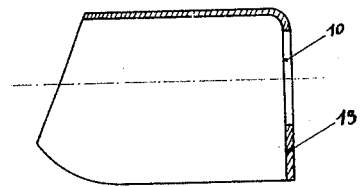

The forming of the box upper part is as follows: From plate 1 cut out a buckler formed piece —1— (Fig. 3) which has in front and rear bow-formed outcut for the front and rear openings of the journal. Press down this plate along the dotted line —12— as shown in Fig. 4 and then we bend the plate down round its axis. The completely formed plate is shown in front view in Fig. 5 and in longitudinal section in Fig. 6. By this method welding is necessary only along line 13. The lower part of the box —1ª— is jointed to the upper part as stated heretofore in any satisfactory manner, but most suitably will be fastened by spot-welding.

On the described journal box some changes may be made too. For example, it is possible to place the play limiters 7 and 8ª in the side of the box, so that they themselves are able to prevent the axial movement of the shell. Instead of two stirrups one may be used, or still more.

I claim as my invention:

1. A journal box for a railway car comprising a housing, a pair of stirrups each having a semicircular section positioned within the housing, a semicircular bearing placed in the top of said housing and resting against the semicircular section of said stirrups, means on the bearing coacting with said stirrups for preventing longitudinal movement of said bearing relative to said housing and removable means co-operating with the housing for preventing rotation of said bearing.

2. A journal box for a railway car comprising a relatively thin housing, a pair of spaced stirrup straps each having a semicircular section positioned within the housing, a semicircular bearing placed in the top of said housing and resting against the semicircular section of said stirrup straps, a flange on the bearing coacting with said stirrup straps for preventing longitudinal movement of said bearing relative to said housing and removable means cooperating with the housing for preventing rotation of said bearing.

In testimony whereof I affix my signature.

FERENC KERTÉSZ.